United States Patent [19]

Rader

[11] Patent Number: 4,590,570

[45] Date of Patent: May 20, 1986

[54] MARINE NAVIGATIONAL AID

[76] Inventor: Carl J. Rader, 357 NW. 87th Ter., Coral Springs, Fla. 33065

[21] Appl. No.: 458,152

[22] Filed: Jan. 14, 1983

[51] Int. Cl.⁴ .......................... G01S 1/20; G05B 11/01
[52] U.S. Cl. ..................................... 364/452; 364/443; 364/449; 318/588
[58] Field of Search ............... 364/452, 443, 449, 447, 364/457, 460, 424, 444; 340/851, 979, 989, 991; 318/580, 588; 343/389

[56] References Cited

U.S. PATENT DOCUMENTS

| | | | |
|---|---|---|---|
| 2,991,011 | 7/1961 | Schuck | 364/452 |
| 3,375,520 | 3/1968 | Groot et al. | 364/552 |
| 3,656,043 | 4/1972 | Kawada et al. | 318/588 |
| 3,699,420 | 10/1972 | Kundler et al. | 318/588 |
| 3,737,635 | 6/1973 | Hastings | 235/150.26 |
| 3,771,483 | 11/1973 | Bond | 364/452 |
| 3,947,849 | 3/1976 | Fehlner et al. | 364/452 |
| 4,038,528 | 7/1977 | Fowler | 318/588 |
| 4,217,593 | 8/1980 | Kauffman | 346/62 |
| 4,253,149 | 2/1981 | Cunningham et al. | 364/452 |
| 4,336,594 | 6/1982 | Masuzawa et al. | 318/588 |

OTHER PUBLICATIONS

U.S. patent application Ser. No. 06/209,821, filed 11/24/80 entitled: "Marine Navigational Aid", now U.S. Pat. No. 4,383,259.

Primary Examiner—Felix D. Gruber
Assistant Examiner—Thomas G. Black
Attorney, Agent, or Firm—Richard M. Saccocio

[57] ABSTRACT

Improved navigational apparatus which interfaces between a Loran C receiver and a ship's auto pilot is disclosed. Output information from the Loran receiver is taken from a standard NMEA jack and is input to the inventive apparatus. Steer and steer correction signals output from the inventive apparatus are input to the auto pilot. The receiver's serial output data is converted to a parallel output and temporarily stored or held by a data latch. A timer releases the data to a logic circuit which supplies steer correction signals to the auto pilot. The timer, in conjunction with the logic circuit, inputs the steer signals at predetermined time spaced intervals to prevent circling of the ship. A data subtractor in conjunction with the timer reduces the ship's rate of return to the predetermined course setting.

9 Claims, 2 Drawing Figures

MARINE NAVIGATIONAL AID

BACKGROUND OF THE INVENTION

1. Field of the Invention

This invention relates in general to the field of marine navigational devices and in particular to improved navigational apparatus which interfaces with a vessel's hyperbolic radionavigational receiver and its auto pilot.

2. Description of the Prior Art

Most modern-day sea-going vessels use an aid known as a Loran (long range aid to navigation) as a means to navigate the vessel from the departure point to its destination. The first operational Loran system, the Loran A, was developed during the Second World War at the Massachusetts Institute of Technology. While the initial implementation of the system was to fulfill wartime needs, it is now used by civilians as well as the military. The Loran system utilizes land-based transmitters in conjunction with onboard receivers. Each of at least two transmitters, transmits pulsed, low frequency (100 kHz) radio waves. At any given vessel position, the location of that position is a function of the distance between the vessel and each of the two transmitters. The difference in distance is in turn a function of the time difference between signals from each transmitter to the vessel. The difference in distance will lie along a hyperbolic line comprising the locus of all positions having exactly the same time difference between the times of arrival of the signals from the transmitters to the vessel. The hyperbolic line is uniformly referred to as a line of position—LOP. Since only one LOP has been established, the vessel's position has not yet been fixed. It is only known that the vessel's position is somewhere along this particular LOP.

To fully fix the vessel's position, another set of transmitters is used. In the same manner as described above, a second LOP is established. The vessel's exact position is at the intersection of the two LOPs. In practice, three, rather than four, transmitters are used. One of the transmitters being common to each set of two transmitters.

The United States Coast Guard is currently responsible for operation of the Loran C system. The Loran C is a much improved version of its predecessor the Loran A system. In 1974, eight Loran C chains were in operation, which included the use of thirty-one transmitting stations in providing coverage for over sixteen million square miles. The coverage is ultimately planned to include the entire United States Coastal Confluence Zone and a large portion of the northern hemisphere.

As mentioned, the Loran C system is used by navigators having onboard receivers specifically designed to receive the signals transmitted at approximately 100 kHz. There are numerous, very sohpisticated and fairly inexpensive Loran C receivers on today's market. In general, the receivers will visually show, by use of a light-emitting diode display, the LOPs of a particular position of a vessel. Having this information, the navigator merely refers to LOP charts to fix his position. The receivers will also convert from a LOP position to a latitude-longitude position. Perhaps one of the more important features of most if not all the receivers is the steer function. The steer function allows a navigator to steer a course along any Loran C chart line. A steer-computed line function allows a navigator to steer along any straight line course. This latter function enables a navigator to steer along the straight line between the point of origin and the desired point of destination. Again, in general, this is accomplished by first determining the vessel's position in terms of intersecting LOPs. Then, the destination LOP's are determined from an appropriate chart. These data are then input into the receiver and the navigator turns the vessel and rudder in an approximate direction to the destination. The receiver will then visually display a vertical bar or bars of light which will be centered along the horizontal display when the vessel is exactly on course. The vertical bar will move in incremental steps to the left or the right depending upon whether the vessel is off course to the left or the right, respectively. The further the vessel is off course, the further the vertical bar will be to the left or the right on the display panel. Typically, one increment represents an off course error of 50 feet. Thus, if the bar of light is three increments to the right, the vessel is 150 feet off course to the right. To put the vessel back on course, it is steered to the left until such time as the bar of light is again at the center of the display console. In actual practice, steering a course by use of the Loran C display results in the vessel making a series of large "S" curves as the vessel tracks back and forth across the computed steer line.

It should be noted that steering a computed course is totally independent of winds, currents and compass errors. In fact, a compass reading is not even needed. This is not, however, to say that a Loran C receiver replaces a compass. It is supplemental thereto.

An auto pilot is another navigational device which has long been known to be a steering aid to ship's captains. Auto pilots, of course, automatically steer a vessel along a desired magnetic bearing. Such devices, however, are not as accurate as steering along a Loran C computed steer line. This is because a magnetic bearing does not account for a vessel's drifting due to currents, wind or tide. Still, for many navigational purposes, an auto pilot is a very useful device.

A very sophisticated system is obtained when a Loran C receiver is integrated with an auto pilot. Instead of a magnetic input, however, the Loran C computed steer line comprises the directon that the auto pilot maintains. With such a system, a vessel's captain need only be concerned with avoiding unforeseen obstacles such as other vessels, low water, uncharted islands, localized thunderstorms, and the like. The advantages of such a system are immense. Human error is virtually eliminated. Missing a point of destination is all but impossible.

My previous invention entitled "Marine Navigational Aid", Ser. No. 06/209,281 now U.S. Pat. No. 4,383,259, filed Nov. 24, 1980, describes apparatus which interfaced with the then state of the art Loran C receivers and auto pilots. That apparatus was intended to provide the benefits of a combined receiver and auto pilot without the need to replace either the Loran C receiver or the auto pilot with which a vessel was already equipped.

Since the disclosure of the interface in my previous patent application, the only significant change to today's Loran C receivers has been the installation of a standard NMEA output plug on the receivers which electronically outputs the on course, off course, distance off course left and right information previously shown on the face of the receiver by LEDs. Thus, the steer function information of the Loran C receiver is now electronically output and visually displayed.

The present invention is intended to utilize the NMEA output plug in interfacing between the Loran receiver and the auto pilot and to provide increased performance over the previously disclosed interface and to allow the use of the auto pilot in virtually its normal mode of operation.

SUMMARY OF THE INVENTION

The present invention comprises improved apparatus which interfaces between a Loran C receiver and vessel's auto pilot serving as a navigation aid whereby the vessel is automatically steered along a predetermined course and any deviations from the predetermined course are automatically corrected.

The inventive apparatus comprises electrical circuitry which converts data output from a NMEA jack into rudder correction signals. A data latch in conjunction with a timer results in timed intermittent rudder correction signals so as to prevent the ship from circling during a course correction. A full subtractor in conjunction with the timer operates to reduce the rate of correction once the vessel is returning toward the preset course so as to eliminate broad sweeping "S" curves when the ship's course is being corrected.

Various other objects, advantages and features of the invention will become apparent to those skilled in the art from the following discussion taken in conjunction with the following drawings, in which:

DESCRIPTION OF THE PREFERRED EMBODIMENTS

Figure 1:
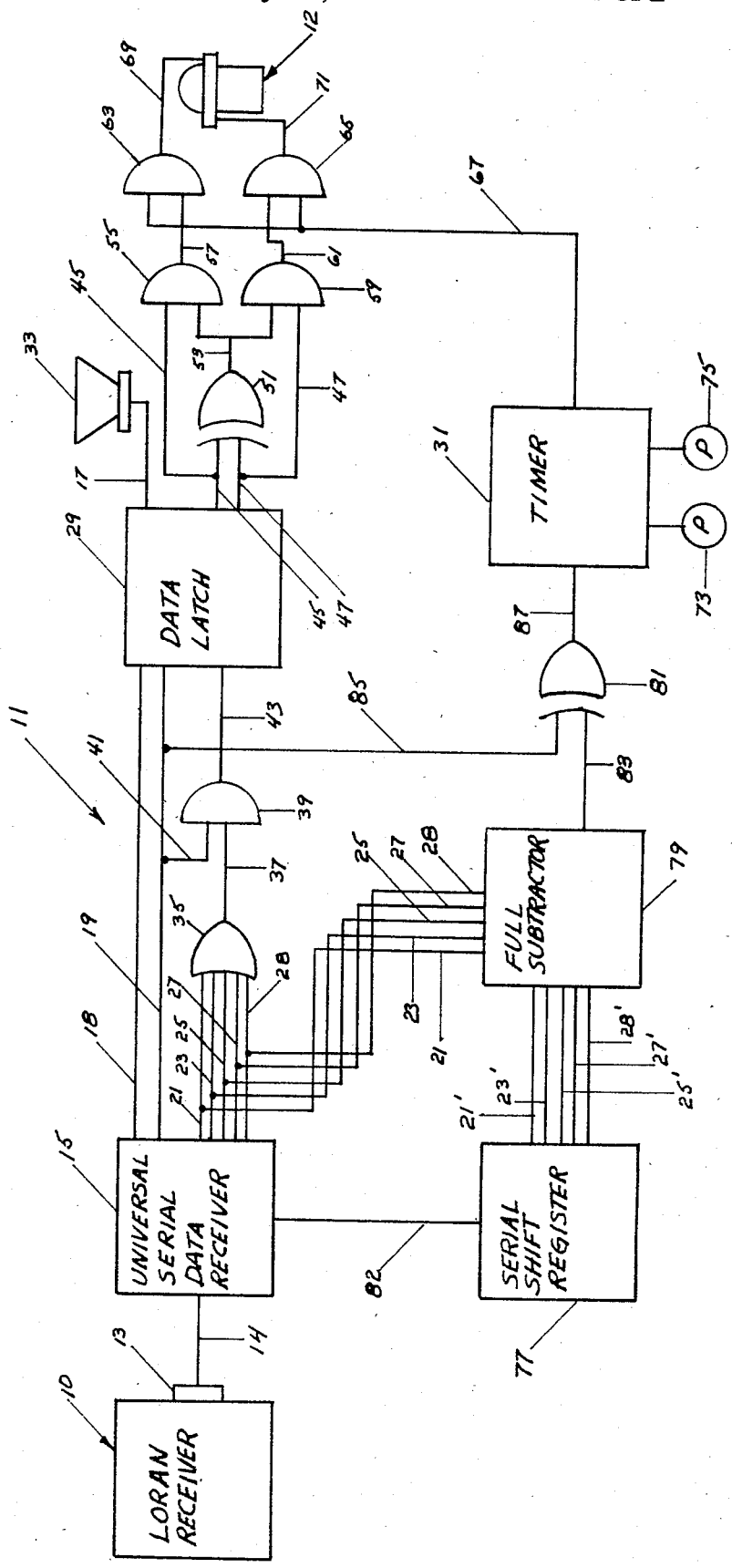
FIG. 1 is a schematic electrical logic diagram of the inventive apparatus.

Referring now to FIG. 1 of the drawings, a typical Loran C receiver is designated by the numeral 10 while a typical auto pilot of a vessel is designated by the numeral 12. It is to be noted that the inventive apparatus, generally designated by the numeral 11, is intended to interface with receiver 10 and auto pilot 12. Neither receiver 16 nor auto pilot 12 form a part of the inventive apparatus. The following description is to be viewed with regard to such typical instruments as are currently available, with the one exception that the Loran receiver 10 is equipped with a National Marine Electronic Association (NMEA) output jack 13. Such fitting or output jack 13 hrs been specified by NMEA to be standard equipment on all Loran C receivers manufactured since the standard was implemented in 1982. Thus, although the NMEA approved receiver 10 and the auto pilot 12 may vary from manufacturer to manufacturer, the variations are inconsequential to the inventive apparatus described herein.

NMEA output jack 13 outputs an eight bit "word" in serial form which in accordance with the standard includes one bit of information that the Loran receiver is properly outputting data in a correct format, one bit for an alarm signal to the effect the vessel is either far off course or the Loran receiver is not properly functioning or a weak signal is being received, one bit for an off course to the left or right signal, and five bits designating the amount of time or distance that the vessel is off course to the left or right of a predetermined course.

A universal serial data receiver 15 receives the eight bit word from NMEA jack 13 and converts the word into parallel bits of information indicating alarm 17 off course left or right 19, and five progressively increasing amounts of time or distances that the vessel is off course, 21, 23, 25, 27 and 28, respectively. The alarm signal 17 is input directly into a data latch 29 which receives the signal 17 and holds or retains it until such time as timer 31 supplies another signal to data latch 29 which allows the alarm signal to be output causing alarm 33 to sound. If signal 17 is of a value that the vessel is neither off course beyond that of signal 28 nor the receiver 10 is malfunctioning then, of course, alarm 23 does not sound.

The five off course signals 21, 23, 25, 27 and 28 are input into an OR gate 35 which outputs a positive logic signal 37 only if any one of the signals 21, 23, 25, 27 or 28 indicate that the vessel is off course by the amount indicated by the particular signal. That is, that either signal 21, 23, 25, 27 or 28 is logic positive. It is immaterial to the invention which logic positive signal 21, 23, 25, 27 or 28 is input to OR gate 35 or by how much the vessel is off course providing it is not beyond that indicated by signal 28. It is sufficient to the invention that the vessel is off course. If the vessel is not off course then a zero logic signal is transmitted by OR gate 35. The output signal 37 of OR gate 35 is input to one leg of AND gate 39. The other input leg 41 of AND gate 39 is supplied by signal 19 (off course left or right). Thus, in order for AND gate 39 to transmit a positive logic signal therefrom, a positive logic signal from both signal 41 and signal 37 must be received or input to AND gate 39. A positive logic signal 43 indicates that the vessel is off course, either to the left or right, and that it is off course within the limits set by signals 21, 23, 25, 27 and 28. Signals 19 and 43 are individually input to data latch 29 which holds these signals before being further transmitted in accordance with the operation of timer 31.

Data latch 29 converts the single reading of signal 19 (which indicates off course left or right depending on its value) into two separate signals 45 and 47 with one signal such as 45 being used to indicate off course to the left (port) (logic positive) or not off course to the left (logic zero); and the other signal 47 being used to indicate off course to the right (starboard) (logic positive) or not off course to the right (logic zero). Signals 45 and 47 are each input to exclusive OR gate 51. If either is logic positive and the other is logic zero, OR gate 51 transmits a logic positive signal 53. Signal 53 is input to one leg of AND gate 55. Signal 45 is input to the other leg of AND gate 55. If both signals 53 and 45 are positive, then, AND gate 55 transmits a logic positive signal 57, which signal is a ship's rudder correction signal for a left off course condition. Similarly, signals 53 and 47 are input to the legs of AND gate 59 and if both are positive then AND gate 59 transmits a positive logic signal 61 which signal is a ship's rudder correction signal for a right off course condition.

However, neither signal 57 nor 61 is directly transmitted to auto pilot 12 for subsequent correction of the angle of the ship's rudder. Each signal 57 and 61 is first directed to one leg of AND gates 63 and 65, respectively. The other leg of gates 63 and 65 are connected to an output signal 67 from timer 31. Thus, a correction to a left off course condition is made only when signal 57 is positive and a positive signal is received from timer 31. And, a correction to a right off course condition is made only when signal 61 is positive and a positive signal is received from timer 31. Of course, signal 57 and signal 61 cannot both be positive at the same time. Also, it is possible that neither signal is positive at any given time, that is, they are both zero when the vessel is on course and no rudder correction is required. Also, even though signals 57 or 61 indicate that a rudder correction is required, such correction is not made if the output of timer 31 is logic zero.

The output 69 of gate 63 is connected internally to the control circuit (not shown) of auto pilot 12 which corrects for the vessel being off course to the left. Hence, a rudder correction steering the vessel to the right is effectuated. Similarly, the output 71 of gate 65 is connected to the auto pilot 12 to effectuate a correction whereby the vessel is steered to the left. No correction or steering signal is transmitted by the inventive apparatus 11 when the vessel is on course. The magnetic setting of the compass (not shown) of auto pilot 12 is used to steer the boat through auto pilot 12 in the desired preset direction.

Timer 31, when arranged as shown in FIG. 1 to AND gates 63 and 65, has been shown by testing to be extremely effective in eliminating a circling condition which might occur when the course of the vessel is being corrected and a strong current exists in a direction perpendicular to the preset course direction. In such a circumstance, when, for example, the vessel is off course to the right and the current is impinging upon the left side of the vessel, the vessel could continuously circle in a counterclockwise direction and never reach the preset line of direction or course setting. This occurs because of the combination effect of the direction of the vessel's rudder (steer left) to correct the off course condition and the force of the current against the left side of the vessel. The same condition could occur when the vessel is off course to the left and the strong current is going to the left against the right side of the vessel. The timer 31 in conjunction with AND gates 63 and 65 prevents such an occurrence. The timer serves to activate the course correction signal (output at either 69 or 71) for a predetermined period of time then to deactivate the signal. This is accomplished by the timer first outputting a logic positive signal for a predetermined length of time then outputting a logic zero signal for a second predetermined length of time. This sequence of signals is then repeated until the vessel is back on course.

Figure 2:
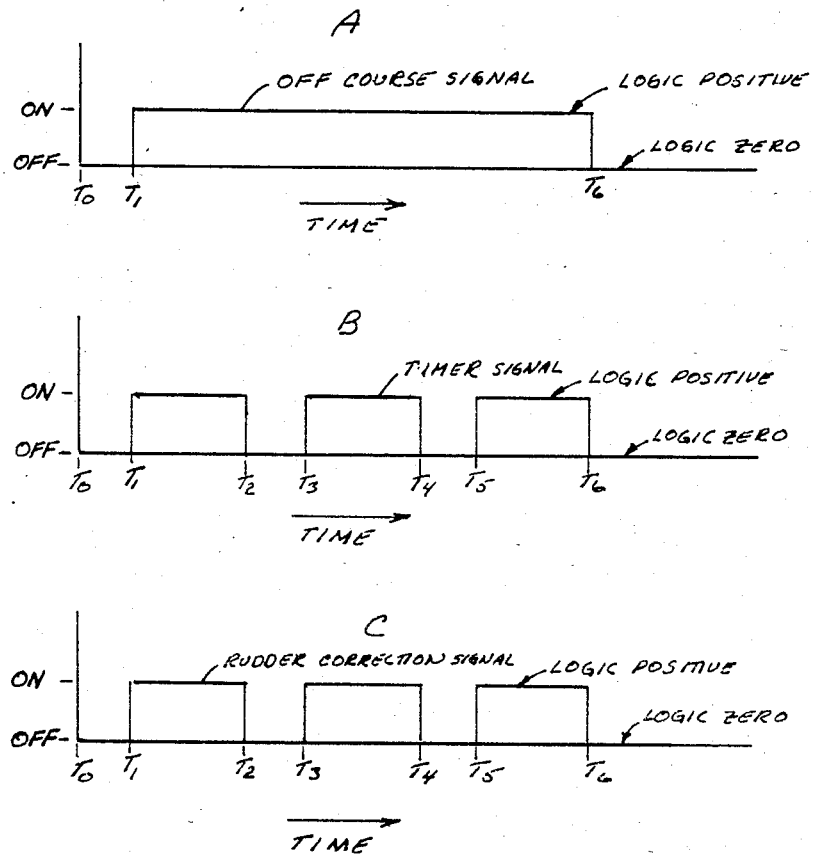
FIG. 2 is a composite bar graph illustrating the combined effect of the timer of the inventive apparatus with an off course signal indicating rudder correction is required.

The timer 31, in effect, is causing the rudder to assume a course correction angle, then to become straight, then to go back to the correction angle and so on repeating the sequence until such time as the vessel is back on course. This rudder action, even when combined with a strong current in a direction perpendicular to the line of travel completely negates any tendency for the vessel to circle. FIG. 2 is illustrative of the combined effect of timer 31 in conjunction with either AND gate 63 or 65.

Curve A shows that at time $T_1$ a positive logic rudder correction signal 57 or 61 is input to AND gate 63 or 65, respectively. Course correction signal 57 or 61 continues until time $T_6$ when the vessel is back on course. Curve B shows that also at time $T_1$, timer 31 is transmitting a logic positive signal 67. Since AND gate 63 or 65 requires two positive signals to output a positive signal, at time $T_1$, signal 69 or 71 is, therefore, logic positive. Thus, is shown in curve C. Hence, at time $T_1$, a rudder correction is made. This rudder correction continues to time $T_2$ when timer 31 begins transmitting a logic zero signal. This causes the rudder to go back to its straight uncorrected positior. At time $T_3$, the rudder is again moved to a correction angle, until time $T_4$ when the rudder is again straight. Between time $T_4$ to $T_5$ the rudder is straight. Between time $T_5$ to $T_6$ the rudder is again angled. At time $T_6$ the vessel is back on course and no correction is applied. Without the effect of timer 31, the rudder would be continuously angled in accordance with curve A which could as previously explained cause the vessel to circle. Corrections to the rudder angle in accordance with curve C prevents circling because of the straightening effect on the vessel between times $T_2$ to $T_3$ and $T_4$ to $T_5$ when the rudder is straight. The time intervals or sequence of intervals in FIG. 2 are merely intended to be illustrative. The actual number of timed intervals will vary for any particular vessel depending in part on the strength of the current, the distance off course, the steering characteristics of the vessel, etc.

Timer 31 is a dual timer so that the time the rudder correction is on and the time between rudder corrections can be varied. In order to accomplish this end result, the first timer is adjusted or set by a first potentiometer 73 which adjusts the length of time between $T_1$ and $T_3$ or $T_3$ and $T_5$, etc. A second potentiometer 75 connected to the second timer adjusts the time between $T_1$ and $T_2$ or $T_3$ and $T_4$, etc. In order for a positive logic signal 67 to be transmitted from timer 31, both of the timers therein must transmit a logic positive signal. When one of the signals is logic zero then signal 67 is logic zero and the auto pilot, acting through auto pilot 12, acts in a normal manner such as if the inventive apparatus 11 was not present. The settings for pctentiometers 73 and 75 are set for a particular vessel and once set need not be changed.

A serial shift register 77 and a full subtractor 79 in combination witb exclusive OR gate 81 serve to slow the rate of return of the vessel from an off course location back to the on course line or course setting. This slowing down of the rate of return of the vessel minimizes the tendency of the vessel to make a larger number of high amplitude "S" turns back and forth across the on course line and in so doing reduces the number of "S" turns and dampens the "essing" of the vessel as it travels closer and closer to the predetermined on course line or setting.

The serial shift register 77 receives 82 and holds the eight bit word previously processed by the data receiver 15. The five bits $21', 23', 25', 27'$, and $28'$ of the previous word which corresponds to the previous amount of time or distance that the vessel is off course is output from the register 77 into full subtractor 79. Full subtractor 79 also has input to it the five bits of the present word being processed 21, 23, 25, 27 and 28 by data receiver 15 and corresponding to the present amount of time or distance that the vessel is off course. Full subtractor 79 subtracts the present word input from the previous word input. If the result is returning to the on course line (as opposed to moving away from the on course line) a positive logic signal 83 is output. If the result is other than positive (when the last word is smaller than the present word), which indicates that the vessel is moving away from the on course line, a zero logic signal 83 is output. Since signal 19 is positive logic whenever the vessel is off course, regardless of whether the vessel is going away from or returning to the on course line, leg 85 of exclusive OR gate 83 is receiving a positive logic signal. Exclusive OR gate 81 outputs a positive logic signal 87 when both inputs 85 and 83 are either zero and positive or positive and zero, respectively. In such a situation, timer 31 remains activated. Thus, when the last word is smaller than the present word indicating the vessel is moving away from the on course line, timer 31 is activated (because the inputs to gate 81 are positive and zero) and maximum course or rudder correction remains in effect. However, when the vessel is returning toward the on course line timer 31 is not activated (since the inputs to gate 81 are positive and positive) and the vessel is allowed to continue to return toward the on course line without the aid of rudder correction by the inventive apparatus 11. This serves, as previously stated, to reduce the rate of return of the vessel to the on course line.

While the invention has been described, disclosed, illustrated and shown in certain terms or certain embodiments or modifications which it has assumed in practice, the scope of the invention is not intended to be nor should it be deemed to be limited thereby and such other modifications or embodiments as may be suggested by the teachings herein are particularly reserved especially as they fall within the breadth and scope of the claims here appended.

I claim:

1. Improved apparatus for steering a vessel along a predetermined course, said apparatus interfacing with a Loran receiver which outputs data in a serial mode and with an auto pilot comprising means for converting the output of said receiver into parallel signals means for storing said parallel signals and for releasing said stored parallel signals at predetermined time intervals means for converting said parallel signals into course correction signals means for inputtting said course correction signals to said auto pilot, and means for allowing said auto pilot to receive said course-correcting signals for a first predetermined period of time and then preventing said auto pilot from receiving said course correction signals for a second predetermined period of time whereby the vessel is steered in a course-correcting mode for said first predetermined period of time and the vessel is steered in a straight-ahead mode for said second predetermined period of time.

2. The apparatus of claim 1, wherein said means for converting the output of the receiver into parallel signals comprises a universal serial data receiver and a serial shift register, the latter of which processes the serial data previously processed by said universal serial data receiver.

3. The apparatus of claim 1, wherein said means for storing and releasing said signals at predetermined time intervals comprises a data latch.

4. The apparatus of claim 1, wherein said means for allowing and preventing receipt of said course correction signals comprises a timer.

5. Improved apparatus for steering a vessel along a predetermined course, said apparatus interfacing with a Loran receiver which outputs data in a serial mode, and with an auto pilot comprising means for converting the output of said receiver into parallel signals means for converting said parallel signals into course correction signals means for inputting said course correction signals to said auto pilot means for comparing a present, first set of parallel signals with a prior, second set of parallel signals and outputting the difference, and means for utilizing said output difference for controlling the operation of a timer, said timer being operationally connected to said means for inputting course correction signals to the auto pilot, whereby the vessel is steered in a course-correction mode when the vessel is moving away from said predetermined course, and the vessel is steered in a straight-ahead mode when the vessel is moving toward said predetermined course.

6. The apparatus of claim 5, wherein said timer includes means for allowing said auto pilot to receive said course-correction signals for a first predetermined period of time whereby the vessel is steered in a course-correcting mode and then for preventing said auto pilot from receiving said course-correction signals for a second predetermined period of time wlereby the vessel is steered in a straight-ahead mode, when the vessel is moving away from said predetermined course.

7. The apparatus of claim 5, wherein said means for converting the output of the receiver into parallel signals comprises a universal serial shift register.

8. The apparatus of claim 5, wherein said means for comparing the present set of signals with a prior set of signals and outputting the difference comprises a serial shift register in combination with a substractor.

9. The apparatus of claim 5, wherein said means for controlling the operation of a timer comprises an exclusive OR gate whereby an on-or-off course signal is input into one input leg and the output of substractor is input into the other input leg and the output of which is input into said timer.

* * * * *